United States Patent
Halcon et al.

(10) Patent No.: US 12,107,377 B2
(45) Date of Patent: Oct. 1, 2024

(54) PLASTIC LATCHING SYSTEM FOR SECUREMENT OF ELECTRONIC COMPONENT TO A DIN RAIL

(71) Applicant: APPLETON Grp LLC, Rosemont, IL (US)

(72) Inventors: Rudy Mark D. Halcon, Antipolo (PH); Kyle Vergel R. Maan, Pasig (PH); Gajanan R. Muttepawar, Maharashtra (IN); Roderick P. De Castro, Batangas (PH)

(73) Assignee: APPLETON GRP LLC, Rosemont, IL (US)

( * ) Notice: Subject to any disclaimer, the term of this patent is extended or adjusted under 35 U.S.C. 154(b) by 417 days.

(21) Appl. No.: 17/723,704

(22) Filed: Apr. 19, 2022

(65) Prior Publication Data

US 2023/0080025 A1    Mar. 16, 2023

(30) Foreign Application Priority Data

Sep. 14, 2021    (IN) .............................. 202121041346

(51) Int. Cl.
*H01R 9/00* (2006.01)
*H01R 9/26* (2006.01)
*H02B 1/052* (2006.01)

(52) U.S. Cl.
CPC ......... *H01R 9/2608* (2013.01); *H02B 1/0526* (2013.01)

(58) Field of Classification Search
CPC ........................... H01R 9/2608; H02B 1/0526
See application file for complete search history.

(56) References Cited

U.S. PATENT DOCUMENTS

| 4,956,747 | A | * | 9/1990 | Beer | ..................... H05K 7/1478 |
| | | | | | 361/728 |
| 5,318,461 | A | * | 6/1994 | Frikkee | ................ H01R 9/2625 |
| | | | | | 361/119 |
| 6,563,697 | B1 | | 5/2003 | Simbeck et al. | |
| 6,904,592 | B1 | | 6/2005 | Johnson | |
| 7,059,898 | B2 | | 6/2006 | Barile | |
| 7,073,971 | B2 | | 7/2006 | Schurr et al. | |
| 8,062,061 | B2 | | 11/2011 | cim et al. | |
| 8,226,433 | B1 | | 7/2012 | correll et al. | |
| 8,379,398 | B2 | | 2/2013 | correll et al. | |
| 8,469,737 | B2 | | 6/2013 | correll et al. | |

(Continued)

FOREIGN PATENT DOCUMENTS

EP          1 833 132 A1    3/2006

*Primary Examiner* — Phuong Chi Thi Nguyen
(74) *Attorney, Agent, or Firm* — MCDONNELL BOEHNEN HULBERT & BERGHOFF LLP

(57) ABSTRACT

An apparatus for securing an electronic component to a DIN rail including an electronic component, a latching system positioned on an end of the electronic component adapted for attachment to the DIN rail, wherein the latching system is made of a plastic material, wherein the DIN rail has a flat upper surface with two legs extending downwardly from, and perpendicular to, the flat upper surface, and a flange extends outwardly from each leg, wherein the latching system includes a recess, an upper surface above the recess having an angled slot positioned in the upper surface adapted to receive an upper flange of the DIN rail, and a lower surface below the recess adapted to have an end of a lower flange of the DIN rail positioned thereover.

14 Claims, 3 Drawing Sheets

(56) References Cited

U.S. PATENT DOCUMENTS

| | | | |
|---|---|---|---|
| 9,331,404 B2 | 5/2016 | Devanand et al. | |
| 9,485,879 B2 | 11/2016 | Molnar et al. | |
| 9,967,995 B2 | 5/2018 | Molnar et al. | |
| 10,340,668 B2 | 7/2019 | Siehler et al. | |
| 10,390,449 B2 | 8/2019 | Jiang | |
| 10,420,232 B2 | 9/2019 | Kamensek et al. | |
| 10,687,433 B1 * | 6/2020 | Raic | H05K 7/1468 |
| 2022/0069550 A1 * | 3/2022 | Ofenloch | H02B 1/16 |
| 2023/0080025 A1 * | 3/2023 | Halcon | H01R 9/2608 439/716 |
| 2024/0088583 A1 * | 3/2024 | Stolze | H01R 9/2608 |

* cited by examiner

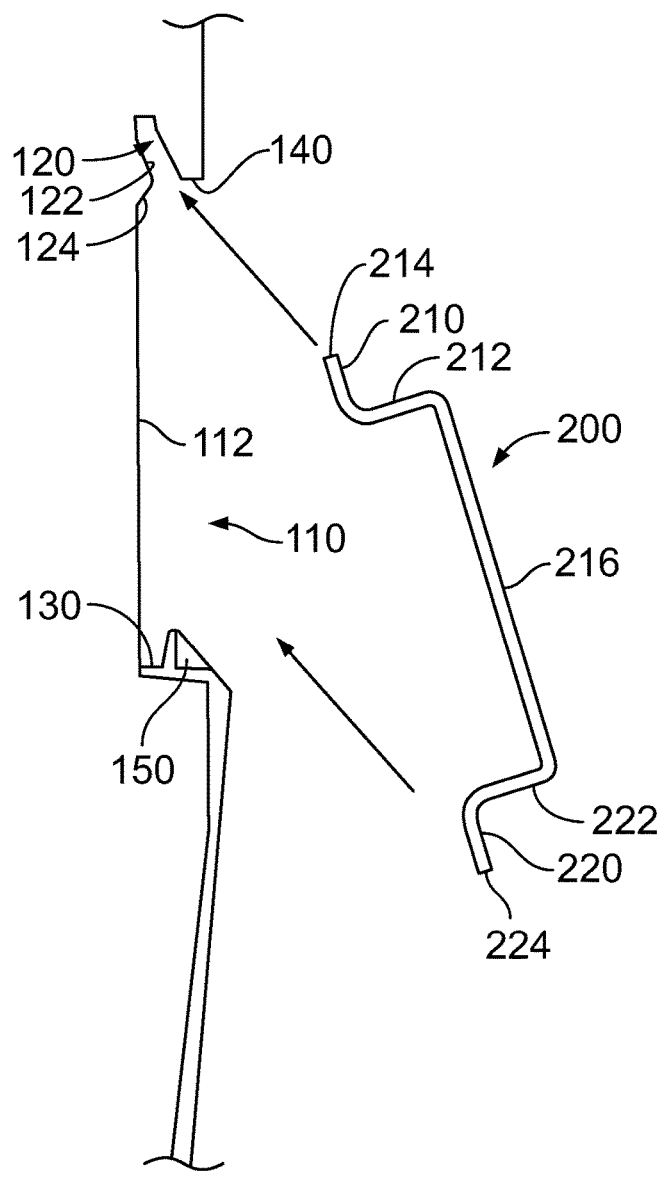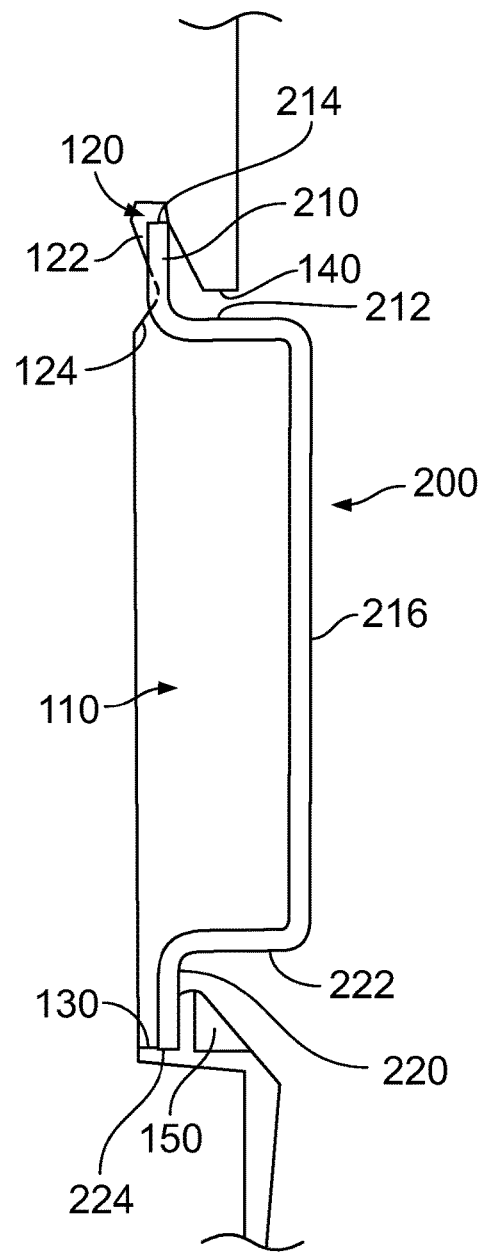
FIG. 3A
FIG. 3B

PLASTIC LATCHING SYSTEM FOR SECUREMENT OF ELECTRONIC COMPONENT TO A DIN RAIL

RELATED APPLICATIONS

This application claims priority to Indian Patent Application No. 202121041346 file Sep. 14, 2021 entitled "Plastic Latching System For Securement of Electronic Component to a DIN Rail", the contents of which are incorporated by reference herein in their entirety.

FIELD

The present disclosure relates to the field of providing a latching system for securing an electrical component to a DIN rail. More particularly, the present disclosure is directed to a latching system for securing an electrical apparatus to a DIN rail where the latching system is made of plastic and can accommodate DIN rails of varied thickness, e.g., thick and thin TS35 DIN rails having a thickness of 1-1.5 mm.

BACKGROUND

Electrical components and housings are often secured to DIN rails positioned on an instrument rack in a control station or cabinet. DIN is an acronym for Deutsches Institut für Normung, or the German Institute for Standardization in English. The mounting rail dimensions and specifications were first standardized by DIN and have since become accepted EN and IEC standards applicable globally. A DIN rail is basically a standard for metallic rails inside of equipment racks onto which are mounted control components such as controllers and other types of modules. DIN rails are often configured with a "top hat" geometry where the DIN rail has a flat upper surface with two legs extending downwardly and perpendicular to the flat upper surface. A flange extends outwardly and perpendicularly from each leg coplanar with the flat upper surface. In other embodiments, the flanges extend at an angle from the legs such that they are not coplanar with the flat upper surface. DIN rails may have a thin thickness of 1 mm, or a thick thickness of 1.5 mm, or somewhere in between. The TS35 DIN rail has a "top hat" geometry and is available with a thin thickness of 1 mm, or a thick thickness of 1.5 mm.

DIN rails are typically made of steel, although other materials such as copper and aluminum may also be used.

In addition, in the past, latching systems used to connect an electronic component to a DIN rail were typically made of metal alloys which are suitable for handling heavy loads. However, as more electronic components become smaller and more lightweight, the need for latching systems made of metal alloys and the ability to handle heavy loads has decreased.

In view of the foregoing, it would be desirable to provide a lighter weight latching system on an electronic component suitable for securing lighter weight electronic components to a DIN rail, as well as to provide a latching system configured on the electronic component to secure the electronic component to a DIN rail having a thickness of 1 mm, as well as 1.5 mm and thicknesses in between.

SUMMARY

The present embodiments advantageously provide a latching system positioned on an end of DIN rail for securing the electronic component to the DIN rail. The latching provides for a secure attachment of an electronic component to the DIN rail In one aspect, an apparatus is provided including an electronic component, a latching system positioned on an end of the electronic component adapted for attachment to a DIN rail, wherein the latching system is made of a plastic material, wherein the DIN rail has a flat upper surface with two legs extending downwardly from, and perpendicular to, the flat upper surface, and a flange extends outwardly from each leg, wherein the latching system includes a recess, an upper surface above the recess having an angled slot positioned in the upper surface adapted to receive an upper flange of the DIN rail, and a lower surface below the recess adapted to have an end of a lower flange of the DIN rail positioned thereon.

In another aspect a method of securing an electronic component to a DIN rail is provided, including (i) providing an apparatus including an electronic component, a latching system positioned on an end of the electronic component adapted for attachment to a DIN rail, wherein the latching system is made of a plastic material, wherein the DIN rail has a flat upper surface with two legs extending downwardly from, and perpendicular to, the flat upper surface, and a flange extends outwardly from each leg, wherein the latching system includes a recess, an upper surface above the recess having an angled slot positioned in the upper surface adapted to receive an upper flange of the DIN rail, and a lower surface below the recess adapted to have an end of a lower flange of the DIN rail positioned thereon; (ii) positioning the upper flange of the DIN rail into the angled slot of the upper surface above the recess of the latching system; and (iii) moving the lower flange of the DIN rail such that the lower end of the lower flange is positioned on the lower surface below the recess of the latching system.

BRIEF DESCRIPTION OF THE FIGURES

FIG. 3A is a side view of latching system 110 before DIN rail 200 is positioned therein.

FIG. 3B is a side view of latching system 110 after the electronic component house 14 of electronic component 10 is secured to DIN rail 200.

DETAILED DESCRIPTION

Figure 1A:
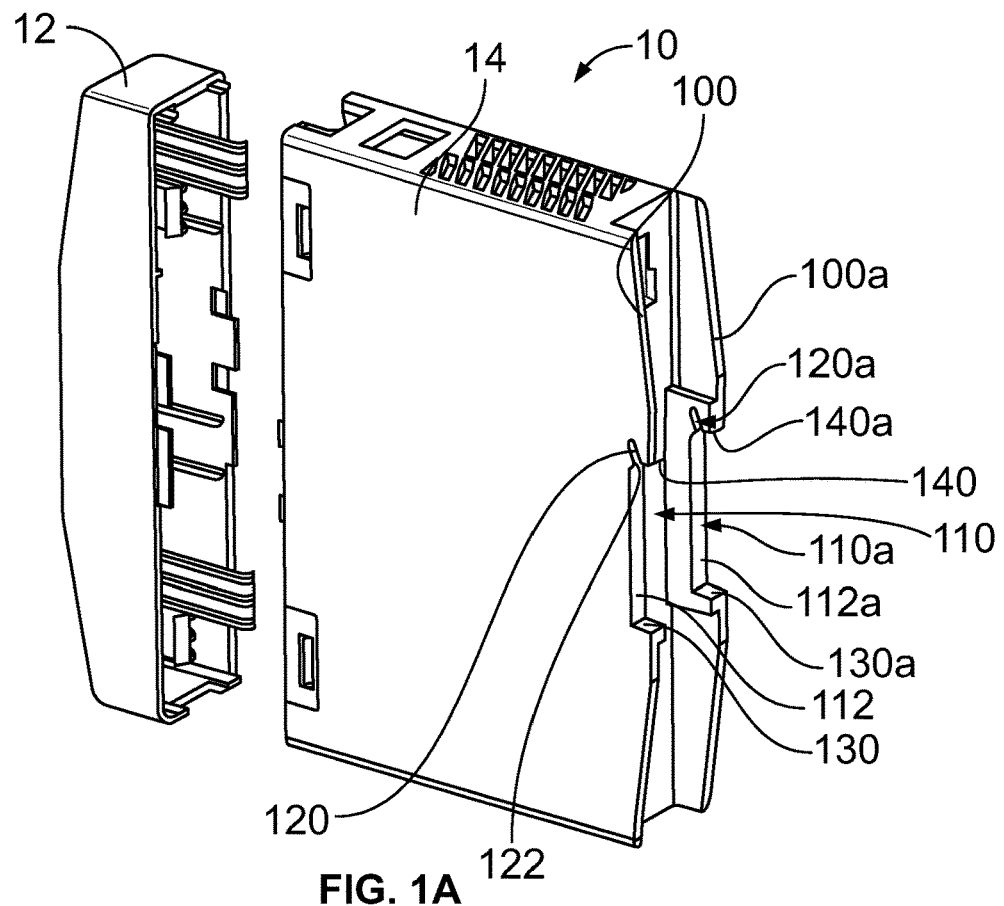
FIG. 1A is a perspective view of electronic component 10.
Figure 1B:
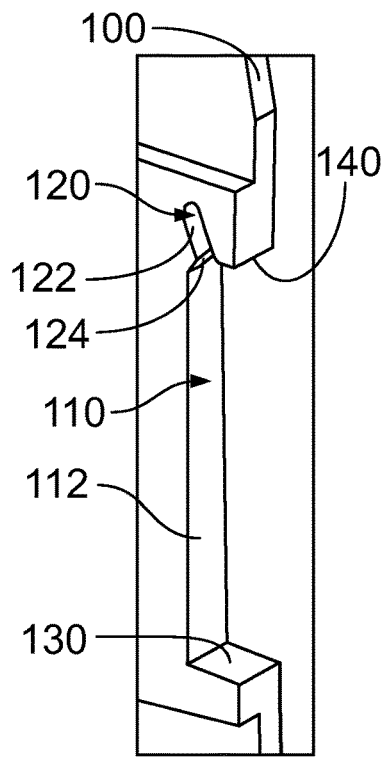
FIG. 1B is a close up perspective view of latching system 110 of electronic component 10 shown in FIG. 1A.
Figure 1C:
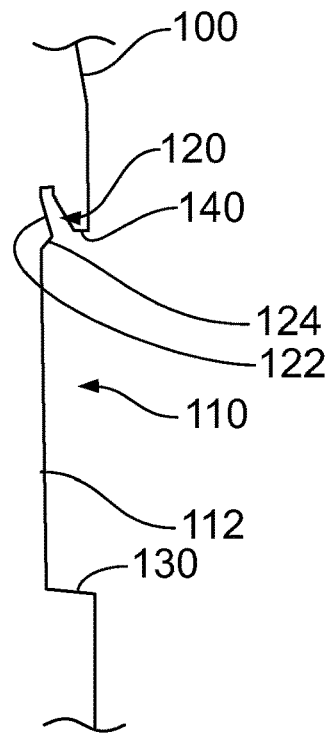
FIG. 1C is a close up side view of latching system 110 shown in FIGS. 1A and 1B.

FIG. 1A is a perspective view of electronic component 10 having a housing 14 and a housing attachment 12. FIG. 1B is a close up perspective view of latching system 110 of electronic component 10 shown in FIG. 1A. FIG. 1C is a close up side view of latching system 110 shown in FIGS. 1A and 1B. A latching system 110, 110a is positioned on the right side of housing 14 as shown in FIGS. 1A-1C. Latching system 110, 110a includes a vertical recess wall 112, 112a. An upper surface 140, 140a is positioned above a recess in the latching system 110, 110a, and a lower surface 130, 130a is positioned below the recess in latching system 110, 110a.

Figure 2:
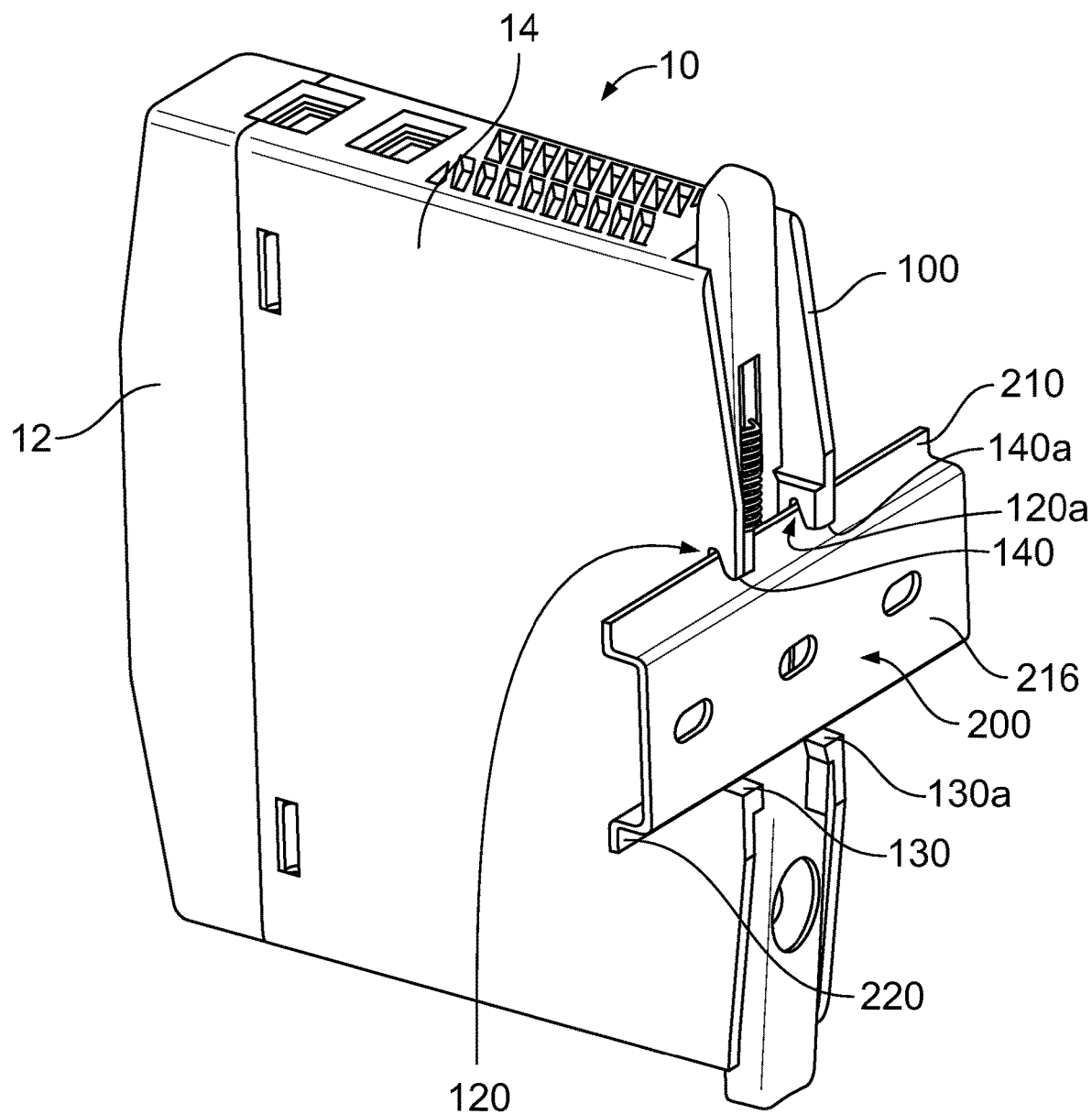
FIG. 2 is a perspective view of electronic component housing 14 of electronic component 10 secured to DIN rail 200.

An angled slot 120 extends into upper surface 140, and a protrusion 124 extends from an inner wall 122 of angled slot 120 that is adapted to receive an upper flange 210 of a DIN rail 200 (shown in FIGS. 2 and 3). The protrusion 124 exerts a force against a lower surface of the upper flange 210 of the DIN rail which is counteracted by a force exerted by an opposed inner surface of the angled slot 120 to provide a securing force on the upper flange 120, thereby providing an initial latch. Angled slot 120 may accommodate an upper flange 210 of the DIN rail 200 having a thin thickness of 1 mm, as well as a thick thickness of 1.5 mm. Angled slot 120 therefore has a width of greater than 1.50 mm, preferably in the range of 1.71 to 1.91 mm, to accommodate DIN rails having a thickness of 1-1.5 mm. The angled slot 120 preferably is angled at an angle of 61.7 degrees+/−3% from horizontal, or preferably at an angle of between 58.7 to 64.7 degrees from horizontal. Lower surface 130 positioned below the recess is adapted to have a lower flange 220 of DIN rail 200 positioned thereover when the electronic component housing 14 is secured to DIN rail 200.

Latching system 110, 110a is made of plastic, which provides a degree of flexibility when securing electronic component housing 14 to DIN rail 200. Latching system 110, 110a is preferably made of a thermoplastic, specifically acrylonitrile butadiene styrene (ABS) or Polycarbonate (PC) or a combination of two thermoplastics PC-ABS.

FIG. 2 is a perspective view of electronic component housing 14 of electronic component 10 secured to DIN rail 200. Upper flange 210 of DIN rail 200 is positioned in angled slots 120, 120a of upper surface 140, 140a of latching system 110, and lower flange 220 of DIN rail 200 is positioned on lower surface 130, 130a.

FIG. 3A is a side view of latching system 110 before DIN rail 200 is positioned therein. FIG. 3B is a side view of latching system 110 after the electronic component housing 14 of electronic component 10 is secured to DIN rail 200. DIN rail 200 shown in FIGS. 3A-3B is shown with a "top hat" geometry where the DIN rail 200 has a flat upper surface 216 with two legs 212, 222 extending downwardly and perpendicular to the flat upper surface 216. An upper flange 210 having an end 214 extends outwardly and perpendicularly from leg 212 coplanar with the flat upper surface 216, and a lower flange 220 having an end 224 extends outwardly and perpendicularly from leg 222 coplanar with flat upper surface 216. In other embodiments, the flanges 210, 220 may extend at an angle from the legs 212, 222 such that they are not coplanar with the flat upper surface 216. DIN rails may have a thin thickness of 1 mm, or a thick thickness of 1.5 mm, or somewhere in between. The TS35 DIN rail has a "top hat" geometry and is available with a thin thickness of 1 mm, or a thick thickness of 1.5 mm.

To secure the DIN rail 200 to the latching system 110, upper flange 210 is inserted into angled slot 120 above the recess. Then the lower flange 220 is rotated in a clockwise direction until the end 224 of lower flange 220 is positioned over lower surface 130 of the recess to lock the DIN rail 200 into position.

Lower surface 130 of the recess may include a backstop 150 extending upwardly from the lower surface 130 that maintains the lower flange 220 in position on the lower surface 130 of the recess. The latching system 110 may be slid into position on the DIN rail 200 such that the upper flange 210 is positioned within the angled slot 120 above the recess and the lower flange 220 is positioned on the lower surface 130 of the recess behind the backstop 150 on the lower surface 130 of the recess.

The plastic latching system 110 provides a number of advantages over prior metal alloy latching systems. The plastic latching system 110 is lighter weight, more economical, easier to manufacture, and provides for easy mounting and demounting from the DIN rail. The plastic latching system 110 also accommodates both thin and thick DIN rails of 1-15 mm. The plastic latching system 110 also provides a degree of flexibility not found in metal alloy latching systems. The configuration of latching system 110 also provides a more secure mounting of the electronic component housing to the DIN rail compared to existing latching systems.

In addition, electronic components may be located in harsh environments which may be prone to vibration. Latching system 110 provides for a secure attachment to a DIN rail even when subjected to vibrations. Furthermore, the latching system 110 may be provided on a variety of different electronic components, and may be integral to the electronic component housing 14 or attached to the electronic component housing 14.

We claim:

1. An apparatus comprising:
   an electronic component;
   a latching system positioned on an end of the electronic component adapted for attachment to a DIN rail;
   wherein the latching system is made of a plastic material;
   wherein the DIN rail has a flat upper surface with two legs extending downwardly from, and perpendicular to, the flat upper surface, and a flange extends outwardly from each leg;
   wherein the latching system comprises:
      a recess;
      an upper surface above the recess having an angled slot positioned in the upper surface adapted to receive an upper flange of the DIN rail; and
      a lower surface below the recess adapted to have an end of a lower flange of the DIN rail positioned thereover.

2. The apparatus of claim 1, wherein the angled slot in the upper surface of the recess accommodates the lower flange of the DIN rail having a thickness between 1-1.5 mm.

3. The apparatus of claim 1, wherein the angled slot has an angle of between 61.7 degrees+/−3% from horizontal.

4. The apparatus of claim 1, wherein when the upper flange is positioned in the angled slot, the lower flange is adapted to be snap fit into position on the lower surface of the beneath the recess of the latching system.

5. The apparatus of claim 1, wherein a backstop upwardly extends from the lower surface below the recess and a lower flange of the DIN rail is positionable over the lower surface below the recess behind the backstop.

6. The apparatus of claim 1, wherein an inner surface of the angled slot has a protrusion extending into an interior of the angled slot.

7. The apparatus of claim 6, wherein the protrusion is adapted to exert a force against a lower surface of the upper flange of the DIN rail which is counteracted by a force on an upper surface or end of the upper flange from an opposed wall of the angled slot when the upper flange of the DIN rail is positioned within the angled slot and the lower flange of the DIN is positioned on the lower surface of the recess.

8. A method of securing an electronic component to a DIN rail, comprising:
   providing an apparatus including an electronic component, a latching system positioned on an end of the electronic component adapted for attachment to a DIN rail, wherein the latching system is made of a plastic material, wherein the DIN rail has a flat upper surface with two legs extending downwardly from, and perpendicular to, the flat upper surface, and a flange extends outwardly from each leg, wherein the latching system includes a recess, an upper surface above the recess having an angled slot positioned in the upper surface adapted to receive an upper flange of the DIN rail, and a lower surface below the recess adapted to have an end of a lower flange of the DIN rail positioned thereover;

positioning the upper flange of the DIN rail into the angled slot of the upper surface above the recess of the latching system; and moving the lower flange of the DIN rail such that the lower end of the lower flange is positioned over the lower surface below the recess of the latching system.

9. The method of claim 8, wherein the angled slot in the upper surface of the recess accommodates an upper leg having a thickness between 1-1.5 mm.

10. The method of claim 8, wherein the angled slot has an angle of 61.7 degrees+/−3% from horizontal.

11. The method of claim 8, wherein the lower flange is snap fit into position on the lower surface of the below the recess.

12. The method of claim 8, wherein a backstop upwardly extends from the lower surface below the recess and a lower flange of the DIN rail is moved into position over the lower surface below the recess behind the backstop.

13. The method of claim 8, wherein an inner surface of the angled slot has a protrusion extending into an interior of the angled slot.

14. The method of claim 13, wherein the protrusion is adapted to exert a force against a lower surface of the upper flange of the DIN rail which is counteracted by a force on an upper surface or end of the upper flange from an opposed wall of the angled slot when the upper flange of the DIN rail is positioned within the angled slot and the lower flange of the DIN is positioned on the lower surface of the recess.

* * * * *